United States Patent
Kalisz et al.

(10) Patent No.: US 8,544,878 B1
(45) Date of Patent: Oct. 1, 2013

(54) ACTIVE BOLSTER WITH CROSS-CONNECTED PLEATS

(75) Inventors: Raymond E. Kalisz, Livonia, MI (US);
Jeffery N. Conley, Belleville, MI (US);
Nicholas A. Mazzocchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/493,063

(22) Filed: Jun. 11, 2012

(51) Int. Cl.
*B60R 21/206* (2011.01)

(52) U.S. Cl.
USPC .................. 280/730.1; 280/752; 280/753

(58) Field of Classification Search
USPC ................ 280/730.1, 751, 752, 753
See application file for complete search history.

(56) References Cited

U.S. PATENT DOCUMENTS

| | | | |
|---|---|---|---|
| 4,168,665 A | 9/1979 | Needham et al. | |
| 5,201,544 A * | 4/1993 | Matano et al. | 280/751 |
| 6,619,689 B2 * | 9/2003 | Spencer et al. | 280/730.1 |
| 6,758,493 B2 | 7/2004 | Conlee et al. | |
| 6,976,706 B2 * | 12/2005 | Smith et al. | 280/753 |
| 7,513,344 B2 * | 4/2009 | Toccalino et al. | 188/371 |
| 7,810,837 B2 | 10/2010 | Thomas et al. | |
| 7,980,589 B2 * | 7/2011 | Best et al. | 280/730.1 |
| 8,308,186 B1 * | 11/2012 | Orlowsky et al. | 280/728.2 |
| 8,328,230 B1 * | 12/2012 | Kalisz | 280/730.1 |
| 8,336,910 B1 * | 12/2012 | Kalisz et al. | 280/730.1 |
| 2011/0115201 A1 * | 5/2011 | Best et al. | 280/728.2 |
| 2011/0123739 A1 * | 5/2011 | Ciplijauskas et al. | 428/35.2 |
| 2011/0272926 A1 * | 11/2011 | Roychoudhury et al. | 280/728.2 |
| 2011/0316300 A1 | 12/2011 | Kalisz | |
| 2012/0112439 A1 * | 5/2012 | Roychoudhury | 280/728.3 |
| 2012/0267878 A1 * | 10/2012 | Kalisz et al. | 280/728.2 |

* cited by examiner

*Primary Examiner* — Joseph Rocca
*Assistant Examiner* — James English
(74) *Attorney, Agent, or Firm* — Vichit Chea; MacMillan, Sobanski & Todd, LLC

(57) ABSTRACT

An active bolster for automotive crash protection has front and back walls with their outer peripheral edges sealed together to provide a bladder chamber therebetween. A gas source supplies an expansion gas to inflate the bladder chamber during a crash. The back wall has a pleated section comprising a plurality of generally-parallel rows of generally-circumferential pleats that unfold during inflation. The unfolding of the pleats controls a deployment trajectory of the front wall, and the pleats have an undulating transverse curve length corresponding to a maximum trajectory of the front wall. The pleated section further comprises a plurality of transverse ribs joining adjacent pleats in selected locations to reduced the unfolding during inflation to provide a modified deployment trajectory.

11 Claims, 4 Drawing Sheets

ACTIVE BOLSTER WITH CROSS-CONNECTED PLEATS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to a pleated expansion wall with transverse ribs that are bridged between adjacent pleats to fine-tune the deployment trajectory (i.e., shape or timing) of the deployed bolster.

An active bolster is a type of vehicle occupant protection device having a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Co-pending application publication US2011/0316300A1, filed Jun. 26, 2010, entitled "Active Knee Bolster for Automotive Vehicle," which is incorporated herein by reference in its entirety, discloses an active knee bolster integrated into a glove box door that is light weight and visually attractive. Active bolsters are also commonly integrated into door panels for side impact protection.

In a typical structure, an active bolster includes a bladder comprised of a front wall or panel that faces a vehicle occupant attached to a back wall or panel along a sealed periphery. One or both of the walls are deformable in order to provide an inflatable (i.e., expandable) bladder. The walls are initially spaced apart by a small distance while in their non-inflated condition. This allows ingress of the inflation gas in a manner that achieves an even inflation across the panel.

The front and back walls of a typical active bolster are comprised of molded thermoplastics such as polyethylene, polyolefin, or PVC. They can be blow molded or injection molded. The back wall commonly employs a pleated structure that unfolds in an accordion-like fashion during inflation to provide the increasing volume of the bladder for forming an impact cushion. So that the bolster follows an outward trajectory away from its rigid mounting structure and toward the passenger, the pleats may be placed circumferentially around the back bladder wall.

Circumferential pleats have typically resulted in an expansion trajectory that is perpendicular to the Class A surface in a generally symmetrical manner. This expansion profile has been desirable in most situations where the potential passenger interaction is symmetrical across the face of the bolster. In some situations, however, the Class A surface may be skewed with respect to the impacting passenger. For example, an instrument panel or dashboard in front of a front passenger seat may be curved or sculpted so that a glove box door is closer to the passenger on the left side than on the right side. A symmetric expansion of an active bolster in the glove box door would result in an uneven impact of the passenger with the bolster. An unsymmetric deployment trajectory can be obtained by shaping the pleats variably around the circumference as disclosed in pending U.S. application Ser. No. 13/460,869, filed May 1, 2012, entitled "Active Bolster with Unsymmetric Pleated Inflation."

In the mass production of automotive vehicles, it is often desirable to utilize a component part without modification on many different vehicle models in order to obtain efficiencies of scale. However, mid-year improvements, model-year changes, and new vehicle applications may require certain changes to an existing design of a component part or the manufacturing equipment and processes by which it is made. With respect to an active bolster, when a change is made that affects the desired deployment trajectory (in terms of the shape, location, or timing of the expansion) then a significant redesign of the expansion pleats and/or other elements of the bolster have been necessitated even when the change in trajectory is small. Similarly, during testing verification of a design or of the tooling being used to manufacture the part, variations from the intended results may be identified which require changes to the tooling. Prior art designs and methods have required expensive and time consuming techniques for implementing the changes.

SUMMARY OF THE INVENTION

In one aspect of the invention, an active bolster is provided for protecting a person in a passenger seating area in an automotive vehicle during a crash event. The bolster comprises an expandable back wall and a front wall overlying the back wall and forming an interior trim component of the vehicle. The front wall has a Class A surface facing the passenger seating area and a Class B surface facing the back wall. The front wall and back wall have outer peripheral edges sealed together to provide a bladder chamber therebetween. A gas source supplies an expansion gas to inflate the bladder chamber during the crash event. The back wall has a pleated section comprising a plurality of generally-parallel rows of generally-circumferential pleats that unfold during inflation. The unfolding of the pleats controls a deployment trajectory of the front wall, and the pleats have an undulating transverse curve length corresponding to a maximum trajectory of the front wall. The pleated section further comprises a plurality of transverse ribs joining adjacent pleats in selected locations to reduced the unfolding during inflation to provide a predetermined deployment trajectory.

DETAILED DESCRIPTION OF PREFERRED EMBODIMENTS

Figure 1:
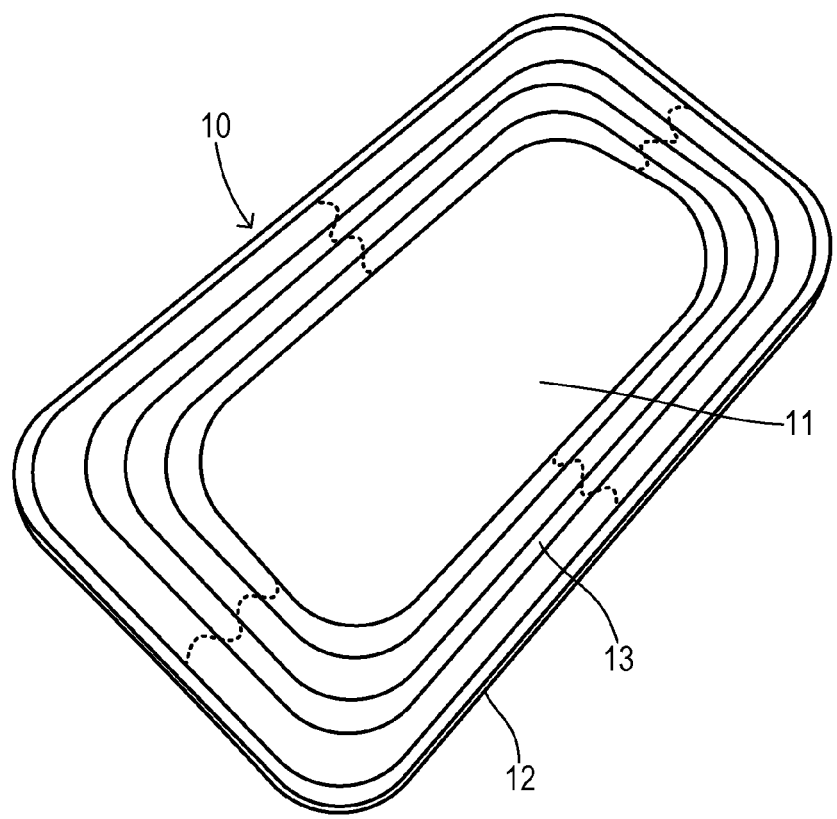
FIG. 1 is a perspective view showing a prior art active bolster having back and front walls creating a bladder chamber.

Referring now to FIG. 1, a back wall 10 of an active bolster is adapted to mate with a front wall for forming an inflatable bladder. Back wall 10 has a central mounting section 11 for attaching to rigid structure such as a glove box door, a dashboard frame, or a door frame. A peripheral edge 12 is provided for sealing together with a front wall (not shown). A pleated section 13 is disposed between central mounting section 11 and peripheral edge 12, and preferably comprises generally-parallel rows of generally-circumferential pleats that straighten out (i.e., unfold) during inflation.

Figure 2:
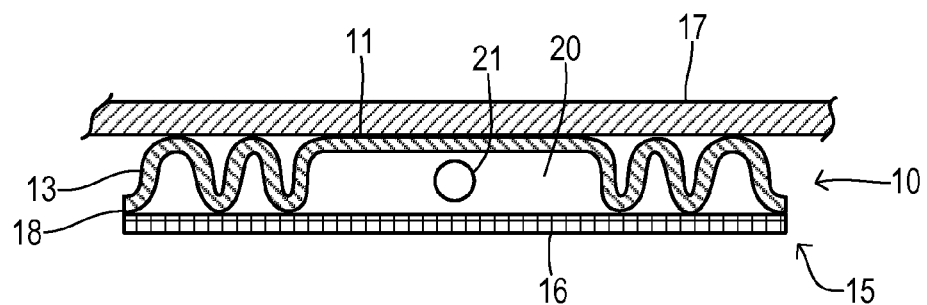
FIG. 2 is a cross section of the active bolster of FIG. 1 mounted to a reaction surface in a vehicle.
Figure 3:
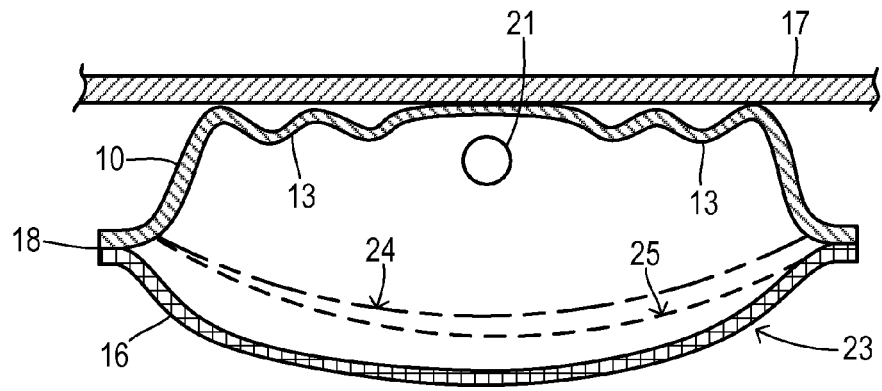
FIG. 3 is a cross section of the active bolster of FIG. 2 after inflation.
Figure 4:
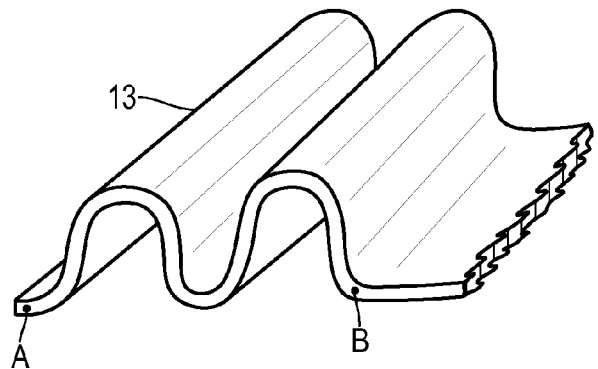
FIG. 4 is a partial perspective view showing the pleats of the back wall in greater details.

FIGS. 2 and 3 show an active bolster 15 with uniform pleats for providing a generally symmetric deployment trajectory. The uninflated bolster 15 is shown in FIG. 2 including a front wall 16 and back wall 10 which is mounted to a rigid vehicle reaction structure 17 such as a dashboard frame, glove box frame, or a door frame. Walls 10 and 16 are sealed around a periphery 18 (e.g., by vibration welding or hot plate welding) to create an inflatable chamber 20 to receive an expansion gas from a gas cylinder 21. Back wall 10 has central mounting section 11 bearing against frame 17 as a reaction surface. A plurality of pleats 13 are formed in back wall 10 around its circumferential periphery. Pleats 13 have been formed with a generally constant size and shape around the periphery so that upon expansion (FIG. 3), front wall 16 expands symmetrically away from frame 17 with respect to a center line of bolster 15. Pleats 13 at each radial position around the circumference of bladder 55 unfold to a substantially identical length, thereby resulting in even expansion and a trajectory perpendicularly outward. The maximum expansion distance is determined in part by the length to which the folds extend when straightened out, i.e., the transverse curve length of the undulations corresponding to the distance between points A and B in FIG. 4 along pleats 13. A position of front wall 16 shown at 23 in FIG. 3 corresponds to a maximum trajectory of front wall 16 if expansion is not restrained or impeded by other factors.

Conventional blow-molded and injection molded designs for active bolsters have had limited tunability. That is, once a product design and the corresponding manufacturing equipment/tooling have been made and tested, it is difficult and expensive to make changes to the design. For example, if it becomes desirable to have the bolster deploy at a different angle or deploy faster or slower, then expensive rebuilding of tooling has been required. It would be desirable to easily modify bolster 15 to obtain a different deployment trajectory such as having a different expansion distance as shown at 24 or a different (e.g., unsymmetric) shape as shown at 25.

Figure 5:
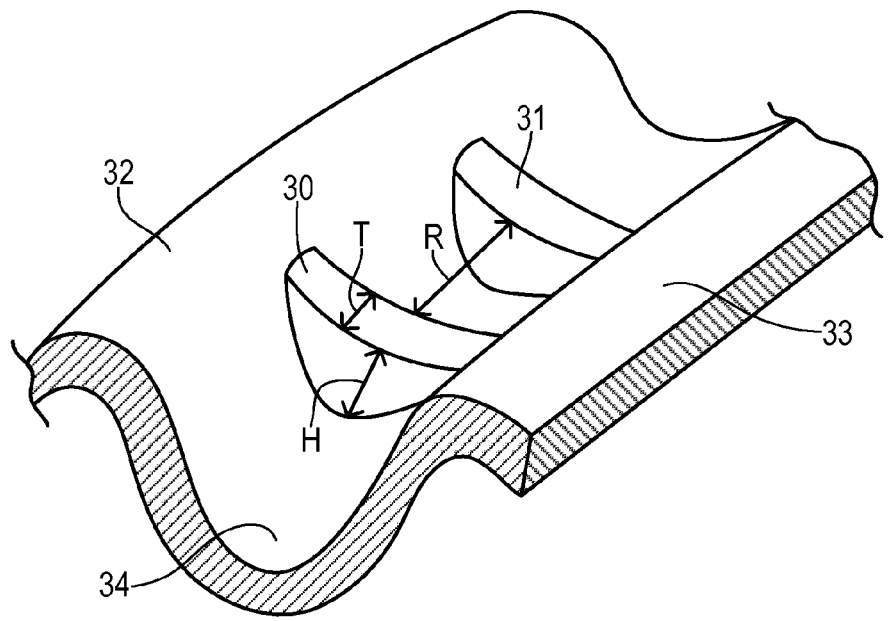
FIG. 5 is a perspective view showing transverse ribs according to one embodiment of the invention for modifying a deployment trajectory.

A pleat-controlled wall expansion with improved tunability is achieved using transverse ribs that join adjacent pleats in selected locations in order to reduce the unfolding of the pleats during inflation and thereby providing a predetermined deployment trajectory. One embodiment of the transverse ribs is shown in FIG. 5 with ribs 30 and 31 between pleats 32 and 33. In particular, pleats 32 and 33 define a concave channel 34 therebetween. Ribs 30 and 31 is each comprised of a plate-like bridge spanning channel 34. As shown for rib 30, each rib disposed within the pleats has a respective thickness T and a respective height H. When more than one rib is employed within channel 34, they are spaced apart by a spacing distance R. The presence of ribs 30 and 31 restricts the deployment trajectory (e.g., speed and/or distance) as compared to the trajectory that would be obtained without ribs 30 and 31.

If sufficient deformation of the transverse ribs is allowed to occur during inflation, the speed of the trajectory may be slowed without substantially altering the final inflated position. The necessary deformability of the ribs depends on thickness T and height H being sufficiently small. Alternatively, the ribs can also include weakenings such as a tear seam that opens after sufficient stress has built up.

Ribs that are thicker, taller, and/or spaced closer together at appropriate locations result in altering the final inflated position. Adjusting these properties of transverse ribs individually at different positions around the circumference of the bolster provides great flexibility in adjusting the direction and distance of the deployment trajectory across the bolster.

Figure 6:
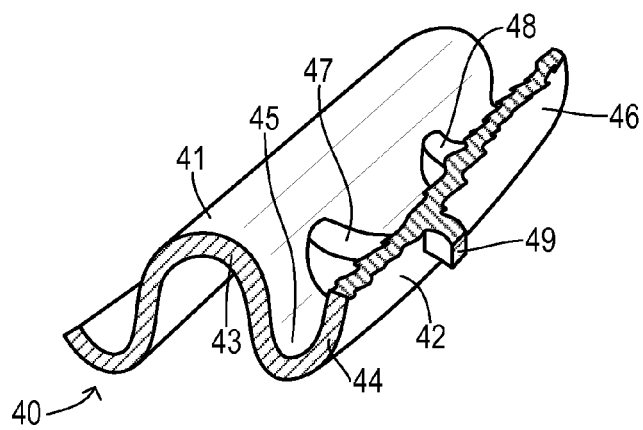
FIG. 6 is a cross-sectional and perspective view showing transverse ribs on both faces of the back wall.

As shown in FIG. 6, the invention includes embodiments wherein the transverse ribs are formed on both faces of a pleated wall. Thus, a wall 40 may be a back wall of a bolster with a forward-facing side 41 and a rearward-facing side 42. A pleated section includes pleats 41 and 42. Channels between adjacent pleats include a forward-facing concave channel 45 and a rearward-facing concave channel 46. Spanning the channels at selected locations are transverse ribs 47, 48, and 49 which are formed as plate-like bridges. The number of available channels to receive transverse ribs is a function of the number of pleats in the pleated section. If only two pleats are used, then there would typically be two frontward-facing channels and one rearward-facing channel. A base design may utilize pleats with an undulating transverse curve length that provides a maximum trajectory greater than any anticipated to be needed for potential applications of the design. The base design would also include a baseline configuration of transverse ribs that restricts the deployment trajectory to meet an average expected trajectory. The base design can then be customized for specific vehicle applications by reshaping the baseline transverse ribs, for example.

Figure 7:
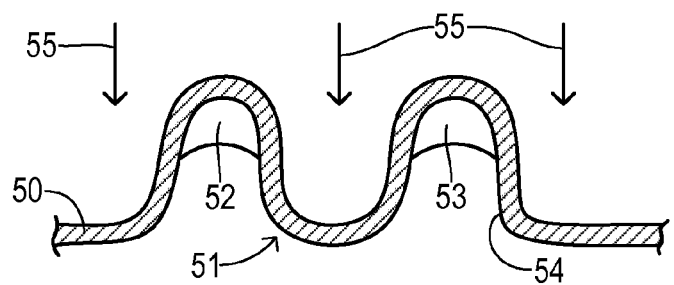
FIG. 7 is a cross section of pleats with transverse ribs on one face of the back wall.

The wall of the present invention is preferably comprised of a molded thermoplastic such as TPO. The wall with transverse ribs is molded in a mold having transverse rib-forming surfaces that are adjusted according to a predetermined deployment trajectory for a predetermined vehicle application. In one embodiment, a wall may be blow molded as shown in FIG. 7. A wall 50 has a pleated section 51 which includes transverse ribs 52 and 53 joining adjacent pleats. Transverse ribs 52 and 53 are on a mold-facing side 54 of wall 50, and no transverse ribs are formed on the other side of wall 50 since wall 50 is expanded during blow molding in the direction of arrows 55.

Figure 8:
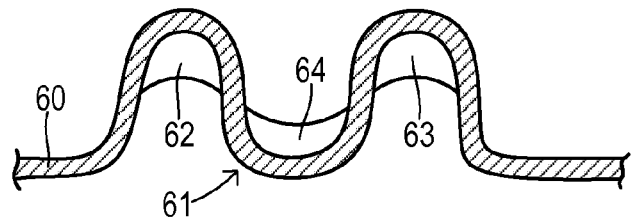
FIG. 8 is a cross section of pleats with transverse ribs on both faces of the back wall.

FIG. 8 shows a wall 60 adapted to be made by injection molding. Since the tooling includes mold surfaces defining both sides of wall 60, a pleated section 61 is formed with transverse ribs 62, 63, and 64 located on both sides of wall 60 (i.e., in both the frontward-facing and rearward-facing channels).

Figure 9:
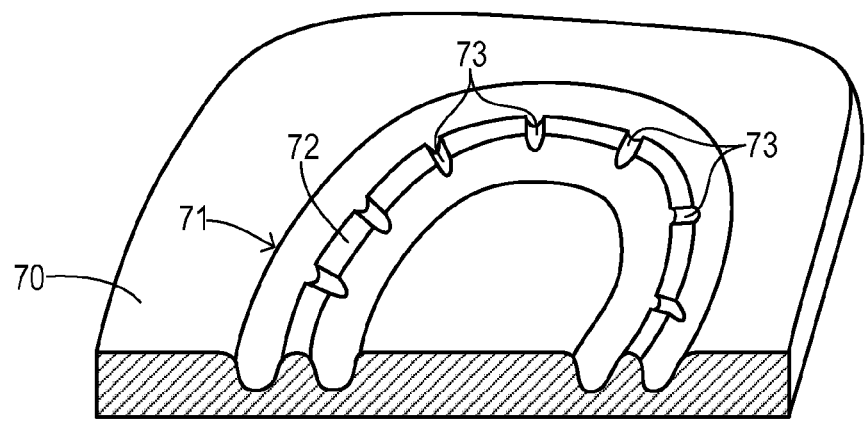
FIG. 9 is a partial perspective view of a tooling die according to one embodiment of the invention.

FIG. 9 shows a molding tool 70 that is typically formed from steel. A finished surface of tool 70 for determining the shape of thermoplastic parts molded in the tool includes an undulating pleated section 71. When injection molding is used, another tool element (not shown) would have a complementary surface for shaping the other side of the part.

Pleated section 71 defines a ridge 72 that corresponds with the concave channel between adjacent pleats in a finished part. A plurality of notches 73 are formed in ridge 72 to create the transverse ribs that join adjacent pleats. It is a relatively simple and inexpensive matter to add or subtract steel material at notches 73 using conventional techniques in order to reshape the transverse ribs (including completely removing a rib or adding a new rib). Engineering development resources are saved since the minimal changes made to tool 70 when modifying it for a changed deployment trajectory require less stringent retesting or requalification.

The invention provides a manufacturing method for active bolsters that is capable of making changes in the behavior of the bolster as it deploys quickly and efficiently. A mold is initially configured for forming the back wall from a moldable thermoplastic to provide a pleated surface on the mold for forming the pleated section, such that the pleated surface has an undulating transverse curve length corresponding to a nominal deployment trajectory of the active bolster. The mold is initially configured to provide a rib surface on the mold for forming a plurality of transverse ribs joining adjacent pleats in selected locations to restrict unfolding of the pleats according to an initial deployment trajectory. Either during development of a product or when developing a new product based on a previous version, a desired modification is identified to the initial deployment trajectory. The rib surface is reshaped to alter the unfolding restriction created by the plurality of transverse ribs to obtain a back wall matching the modified deployment trajectory.

What is claimed is:

1. An active bolster for protecting a person in a passenger seating area in an automotive vehicle during a crash event, comprising:
    an expandable back wall;
    a front wall overlying the back wall and forming an interior trim component of the vehicle, wherein the front wall has a surface facing the passenger seating area and a surface facing the back wall, wherein the front wall and back wall have outer peripheral edges sealed together to provide a bladder chamber therebetween; and
    a gas source for supplying an expansion gas to inflate the bladder chamber during the crash event;
    wherein the back wall has a pleated section comprising a plurality of generally-parallel rows of generally-circumferential pleats that unfold during inflation, wherein the unfolding of the pleats controls a deployment trajectory of the front wall, and wherein the pleats have an undulating transverse curve length corresponding to a maximum trajectory of the front wall;
    wherein the pleated section further comprises a plurality of transverse ribs joining adjacent pleats in selected locations to reduce the unfolding during inflation to provide a predetermined deployment trajectory; and
    wherein the pleats comprise two or more frontward-facing concave channels and at least one rearward-facing concave channel, and wherein each transverse rib is comprised of a plate-like bridge spanning a respective channel at each selected location.

2. The active bolster of claim 1 wherein the plurality of transverse ribs reduces a speed of expansion along the predetermined deployment trajectory.

3. The active bolster of claim 1 wherein the plurality of transverse ribs shortens the predetermined deployment trajectory with respect to the maximum trajectory.

4. The active bolster of claim 1 wherein the plurality of transverse ribs includes transverse ribs located in both the frontward-facing concave channel and the rearward-facing concave channel.

5. The active bolster of claim 1 wherein the back wall is comprised of molded thermoplastic, wherein the transverse ribs are molded in a mold having transverse rib-forming surfaces that are adjusted according to the predetermined deployment trajectory.

6. A method of manufacturing an active bolster for protecting a person in a passenger seating area in an automotive vehicle during a crash event, wherein the active bolster includes front and back walls with outer peripheral edges sealed together to provide a bladder chamber therebetween, wherein the back wall has a pleated section comprising a plurality of generally-parallel rows of generally-circumferential pleats that unfold during inflation of the active bolster during the crash event, and wherein the unfolding of the pleats controls a deployment trajectory of the front wall, the method comprising the steps of:
    configuring a mold for forming the back wall from a moldable thermoplastic to provide a pleated surface on the mold for forming the pleated section, wherein the pleated surface has an undulating transverse curve length corresponding to a nominal deployment trajectory of the active bolster;
    configuring the mold to provide a rib surface on the mold for forming a plurality of transverse ribs joining adjacent pleats in selected locations to restrict unfolding of the pleats according to an initial deployment trajectory, wherein the pleats comprise two or more frontward-facing concave channels and at least one rearward-facing concave channel, and wherein each transverse rib is comprised of a plate-like bridge spanning a respective channel at each selected location;
    identifying a desired modification to the initial deployment trajectory; and
    reshaping the rib surface to alter the shapes of the plate-like bridges and the unfolding restriction created by the plurality of transverse ribs to obtain a back wall matching the modified deployment trajectory.

7. The method of claim 6 wherein the reshaping step comprises altering the rib surface to increase a rib height at locations on the active bolster in which the modified deployment trajectory is more restricted than the initial deployment trajectory.

8. The method of claim 6 wherein the reshaping step comprises altering the rib surface to decrease a rib height at locations on the active bolster in which the modified deployment trajectory is less restricted than the initial deployment trajectory.

9. The method of claim 6 wherein the reshaping step comprises altering the rib surface to increase a spacing between adjacent transverse ribs at locations on the active bolster in which the modified deployment trajectory is less restricted than the initial deployment trajectory.

10. The method of claim 6 wherein the reshaping step comprises altering the rib surface to decrease a spacing between adjacent transverse ribs at locations on the active bolster in which the modified deployment trajectory is more restricted than the initial deployment trajectory.

11. A bolster comprising:
    front and back walls sealed together to form a bladder chamber; and
    a gas source to controllably inflate the bladder chamber;
    wherein the back wall comprises one rearward-facing concave channel between two frontward-facing concave channels that unfold during inflation and a plurality of transverse ribs each comprised of a plate-like bridge spanning a respective channel in selected locations to restrict the unfolding to provide a restricted deployment trajectory.

* * * * *